E. O. BALL.

Self Heating Smoothing Iron.

No. 29,048.

Patented July 10, 1860.

Witnesses:
C. M. Alexander
A. Yeatman

Inventor:
E. O. Ball.

UNITED STATES PATENT OFFICE.

E. O. BALL, OF GREENSBURG, OHIO.

SELF-HEATING SMOOTHING-IRON.

Specification of Letters Patent No. 29,048, dated July 10, 1860.

*To all whom it may concern:*

Be it known that I, E. O. BALL, of Greensburg, in the county of Trumbull and State of Ohio, have invented certain new and useful Improvements in Self-Heating Smoothing-Irons; and I do hereby declare that the following is a full, clear, and exact description of the same, reference being had to the accompanying drawings and to the characters of reference marked thereon.

The nature of my invention consists in constructing and arranging the several parts of this iron substantially in the manner hereinafter described.

Figure 1:
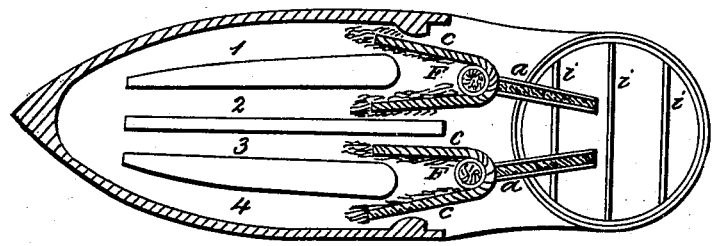
Figure 2:
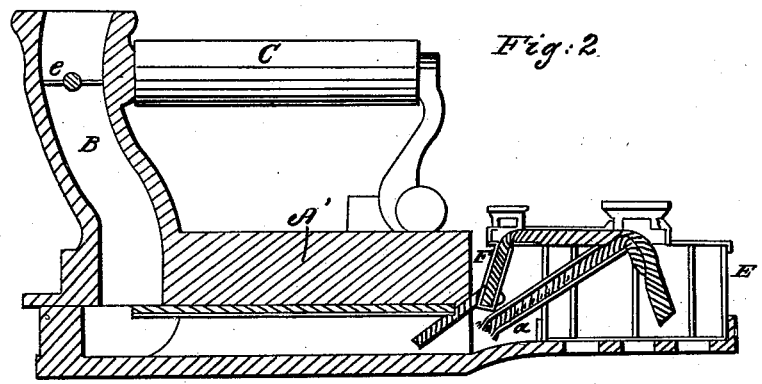
Figure 3:
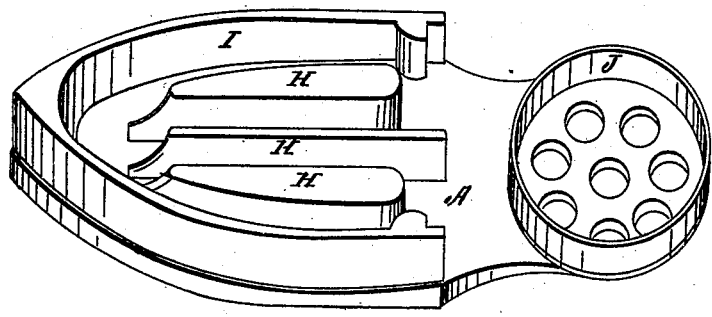

In the annexed drawings Figure 1 is a plan view of the bottom portion of the iron, and Fig. 3 is a perspective of the same. Fig. 2, is a longitudinal vertical section.

In the figures A, A′, represent the body of the iron. A, being the bottom and A′, the top portion of said body. The body is metallic and is divided as represented, the top being secured to the bottom by means of screws or otherwise as may be most convenient. The top portion of the body is provided with the chimney B and the handle C. The lower portion of said body is provided with three divisions H, H, H, which form with the flange I, four channels marked 1, 2, 3, 4, through which heat is passed back to and up the chimney B. The lower portion of this body is also provided with a ledge or table at its rear which is surrounded with an annular flange J. A lamp is placed upon this table and is held in proper position by means of the flange J.

E, represents the lamp, which is placed upon the table. This lamp is provided internally with three divisions or partitions $i$, $i$, $i$, through which oil may pass, but which are intended to prevent the body of the oil in the lamp from shaking or moving about as the lamp is used, so as to affect the light or the flame which heats the iron. Two tubes $a$, $a$, project from the sides of the lamp as seen, Figs. 1 and 2, and two pipes project from the lamp above the tubes $a$, $a$.

The tubes ($a$) and the pipes (F) are both provided with wicks. The lower ends of the pipes F, stand just above the ends of the tubes $a$, $a$, and are provided each, with two small holes, for the purpose of allowing jets of gas to pass out when the lamp is to be used. Oil passes down the tubes $a$, $a$, and the wicks at their ends being lighted the flames from said wicks heat the ends of the pipes F, thus forming a gas, or vapor, which passes through holes in the ends of said pipes, and thence into the channels 1, 2, 3, 4, in the body of the lamp.

$c$, $c$, $c$, $c$, represent wire conductors which are secured to the pipes (F) in such a manner that the flames from said pipes will be conducted by them into the lamp.

It will be understood that I intend to burn the common burning fluid composed of turpentine and alcohol in the lamp. This fluid or oil is easily converted into a gas or vapor which heats the iron. A damper $e$, is secured in the chimney B, for the purpose of regulating the heat, so that the iron may not become too warm.

It will be readily seen that the flames enter the rear of the body of the iron and pass forward, thus heating the entire iron in a few moments.

Having thus fully described my invention what I claim as new and desire to secure by Letters Patent is—

1. The arrangement of the pipes F, F, the wick tubes $a$, $a$, and the wire conductors $c$, $c$, with the partitions H, H, on the body of the iron the same being used substantially as and for the purpose specified.

2. The arrangement of the flanged lamp stand, the lamp provided with tubes F F, tubes $a$, $a$, and partitions $i$, $i$, $i$, the partitions H, H, and the damper $e$, the whole being used substantially in the manner and for the purpose specified.

E. O. BALL.

Witnesses:
R. R. BASCOM,
JAS. A. LILLIBRIDGE.